(12) United States Patent
Adreon et al.

(10) Patent No.: US 8,250,132 B2
(45) Date of Patent: Aug. 21, 2012

(54) MANAGING MESSAGES RELATED TO WORKFLOWS

(75) Inventors: James Scott Adreon, Evergreen, CO (US); Saha Avijit, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/774,379

(22) Filed: Jul. 6, 2007

(65) Prior Publication Data

US 2009/0013047 A1    Jan. 8, 2009

(51) Int. Cl.
*G06F 15/16* (2006.01)
*G06F 3/00* (2006.01)

(52) U.S. Cl. ........................ 709/201; 719/313

(58) Field of Classification Search .......... 709/227, 709/207, 201; 706/47; 705/8; 704/9; 719/313
See application file for complete search history.

(56) References Cited

U.S. PATENT DOCUMENTS

| | | | |
|---|---|---|---|
| 6,185,599 B1 * | 2/2001 | Salimando et al. | 709/202 |
| 6,219,691 B1 * | 4/2001 | Youn | 709/200 |
| 6,490,574 B1 * | 12/2002 | Bennett et al. | 706/47 |
| 6,934,766 B1 * | 8/2005 | Russell | 709/246 |
| 7,222,333 B1 * | 5/2007 | Mor et al. | 717/115 |
| 7,761,597 B2 * | 7/2010 | Takeda et al. | 709/245 |
| 2002/0035606 A1 * | 3/2002 | Kenton | 709/206 |
| 2002/0049751 A1 | 4/2002 | Chen et al. | |
| 2002/0052771 A1 * | 5/2002 | Bacon et al. | 705/8 |
| 2002/0165912 A1 * | 11/2002 | Wenocur et al. | 709/203 |
| 2002/0178360 A1 * | 11/2002 | Wenocur et al. | 713/170 |
| 2002/0194483 A1 * | 12/2002 | Wenocur et al. | 713/185 |
| 2002/0194501 A1 * | 12/2002 | Wenocur et al. | 713/201 |
| 2002/0196935 A1 * | 12/2002 | Wenocur et al. | 380/37 |
| 2002/0199001 A1 * | 12/2002 | Wenocur et al. | 709/227 |
| 2002/0199096 A1 * | 12/2002 | Wenocur et al. | 713/153 |
| 2003/0009694 A1 * | 1/2003 | Wenocur et al. | 713/201 |
| 2003/0023675 A1 * | 1/2003 | Ouchi et al. | 709/203 |
| 2003/0041110 A1 * | 2/2003 | Wenocur et al. | 709/206 |
| 2004/0059808 A1 * | 3/2004 | Galloway et al. | 709/224 |
| 2004/0258044 A1 | 12/2004 | Girouard et al. | |
| 2005/0044156 A1 * | 2/2005 | Kaminski et al. | 709/206 |
| 2005/0114243 A1 * | 5/2005 | Scumniotales et al. | 705/35 |
| 2005/0114453 A1 | 5/2005 | Hardt | |
| 2005/0188045 A1 | 8/2005 | Katsikas | |
| 2006/0009249 A1 | 1/2006 | Fu et al. | |
| 2006/0212286 A1 * | 9/2006 | Pearson et al. | 704/9 |
| 2007/0043872 A1 * | 2/2007 | Pattan et al. | 709/227 |
| 2007/0050454 A1 | 3/2007 | Zanter | |
| 2008/0140793 A1 * | 6/2008 | Ouchi | 709/206 |
| 2008/0301250 A1 * | 12/2008 | Hardy et al. | 709/207 |

OTHER PUBLICATIONS

Gary Boone, Concept Features in Re:Agent, &n Intelligent Email Agent, May 10-13, 1998, ACM, International Conference on Autonomous Agents, Proceedings of the second international conference on Autonomous agents, pp. 141-148.*

Gary Boone, Concept Features in Re:Agent, &n Intelligent Email Agent, May 10-13, 1998, Autonomous Agents 98, Minneapolis, MN USA, pp. 1-8.*

* cited by examiner

*Primary Examiner* — Firmin Backer
*Assistant Examiner* — Michael A Chambers
(74) *Attorney, Agent, or Firm* — Yee & Associates, P.C.; Arthur J. Samodovitz

(57) ABSTRACT

A message and a tag are sent to a set of recipients, wherein the tag contains state information for the message. In response to receiving an event from a recipient within the set of recipients, the reply message tag is processed with a policy to identify an action. The action identified by processing the event with the policy is performed.

24 Claims, 7 Drawing Sheets

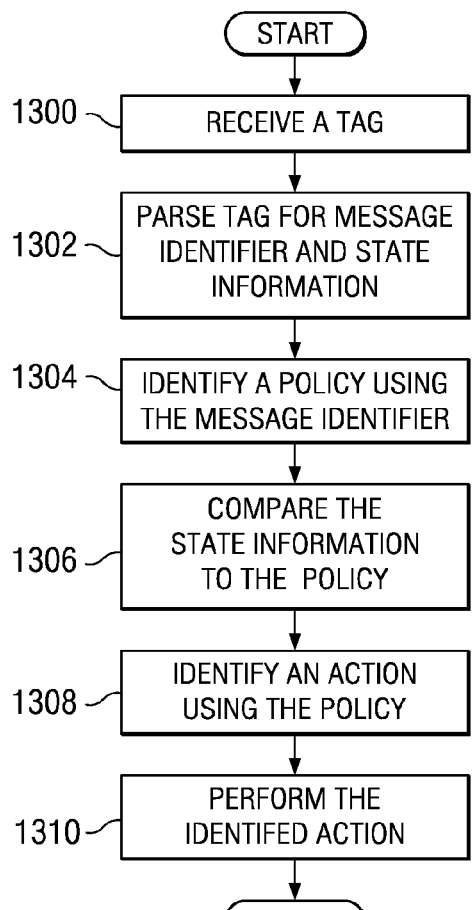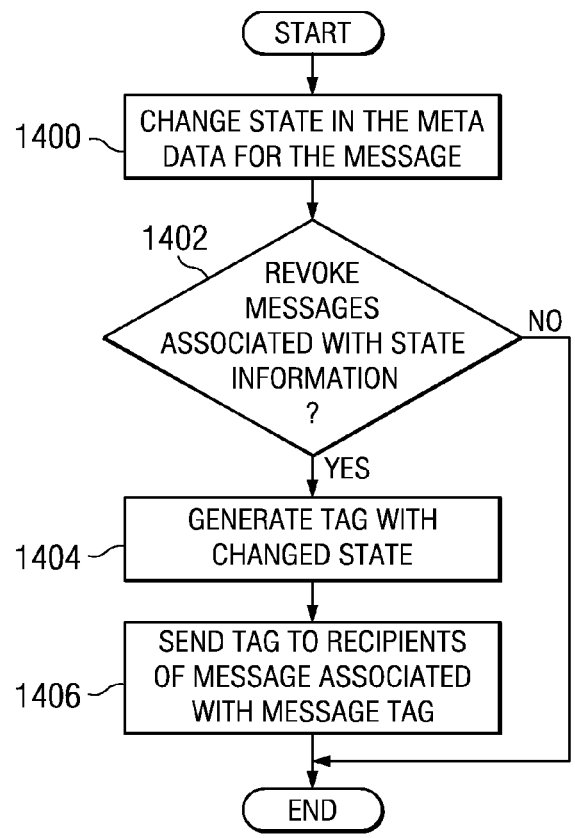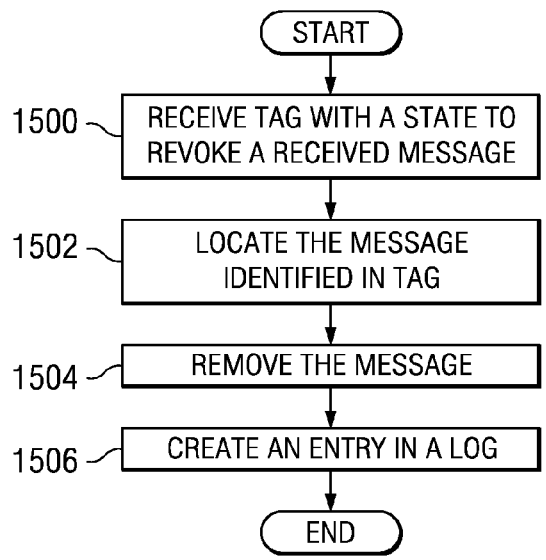

MANAGING MESSAGES RELATED TO WORKFLOWS

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for managing message notifications.

2. Description of the Related Art

Applications are often used to manage or process workflow, which is a movement of information and/or tasks through a work process. More specifically, workflow includes units of activity carried out by a person or data processing system. These units of activity also are referred to as tasks. Within a workflow, tasks are present in which who performs a task and the relative order of the tasks may be defined. Based on what tasks have been performed, what tasks are being performed, and what tasks need to be performed, a workflow has different states.

In many applications, a separate email or other type of notification message may be sent to a user. For example, in the case of an accounts payable workflow, invoice processing may reach an approval stage. When this state in the workflow is reached, a designated approver is sent a notification telling that person that they are required to log on to an accounts payable application to approve the processing request. This notification is typically sent using a message, such as an email message.

In some scenarios, the request to approve an invoice may follow parallel paths. More specifically, the notifications requesting approval of the invoice may have been sent to more than one approver. With this type of parallel path, one approver may already have approved the request, while another approver has not yet looked into the request in the email message. If the request has already been processed, it would be useful to avoid having the second approver log on to the accounts payable application to find out that the request has already been approved.

Currently, even though one user may perform the action, other users may still have to log into the accounts payable application only to see that the invoice has already been approved. These types of parallel notifications that are sent to multiple users for the same action makes the overall process efficient. The drawback, however, is a loss in time or productivity for other users having to process messages requesting actions when those actions have already been performed.

SUMMARY OF THE INVENTION

The illustrative embodiments provide a computer implemented method, apparatus, and computer usable program code for managing messages. A message and a tag are sent to a set of recipients, wherein the tag contains state information for the message. In response to receiving an event from a recipient within the set of recipients, the event is processed with a policy to identify an action. The action identified by processing the event with the policy is performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13 is a flowchart of a process handling receipt of an event in the form of a tag in accordance with an illustrative embodiment;

FIG. 14 is a flowchart of a process for handling a state change in accordance with an illustrative embodiment; and FIG. 15 is a flowchart of a process for handling a state change in accordance with an illustrative embodiment.

DETAILED DESCRIPTION OF THE PREFERRED EMBODIMENT

Figure 1:
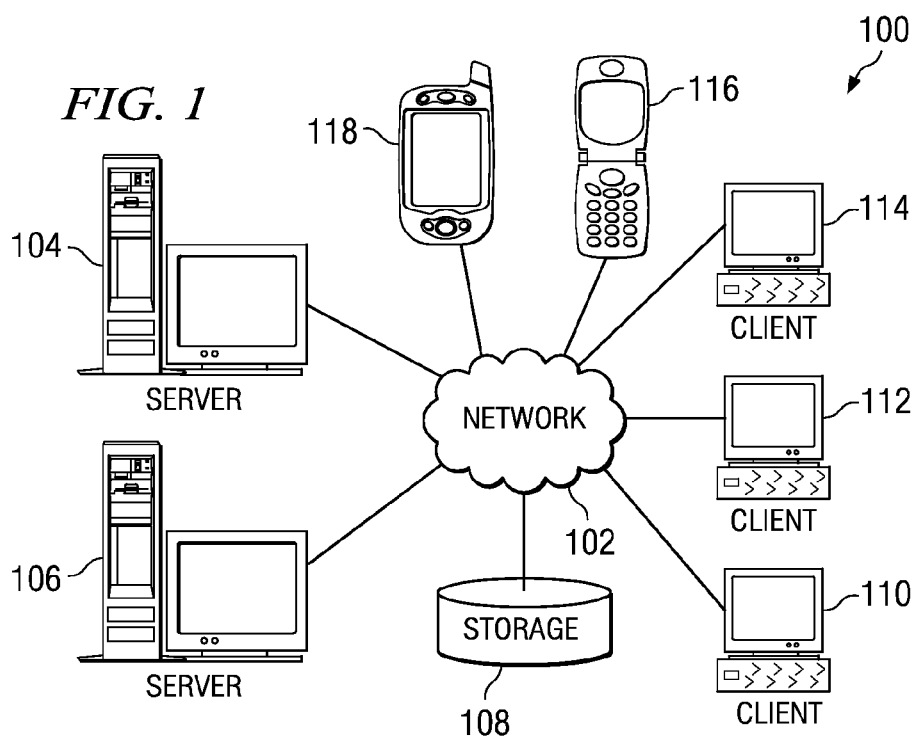
FIG. 1 is a pictorial representation of a network of data processing systems in which illustrative embodiments may be implemented.
Figure 2:
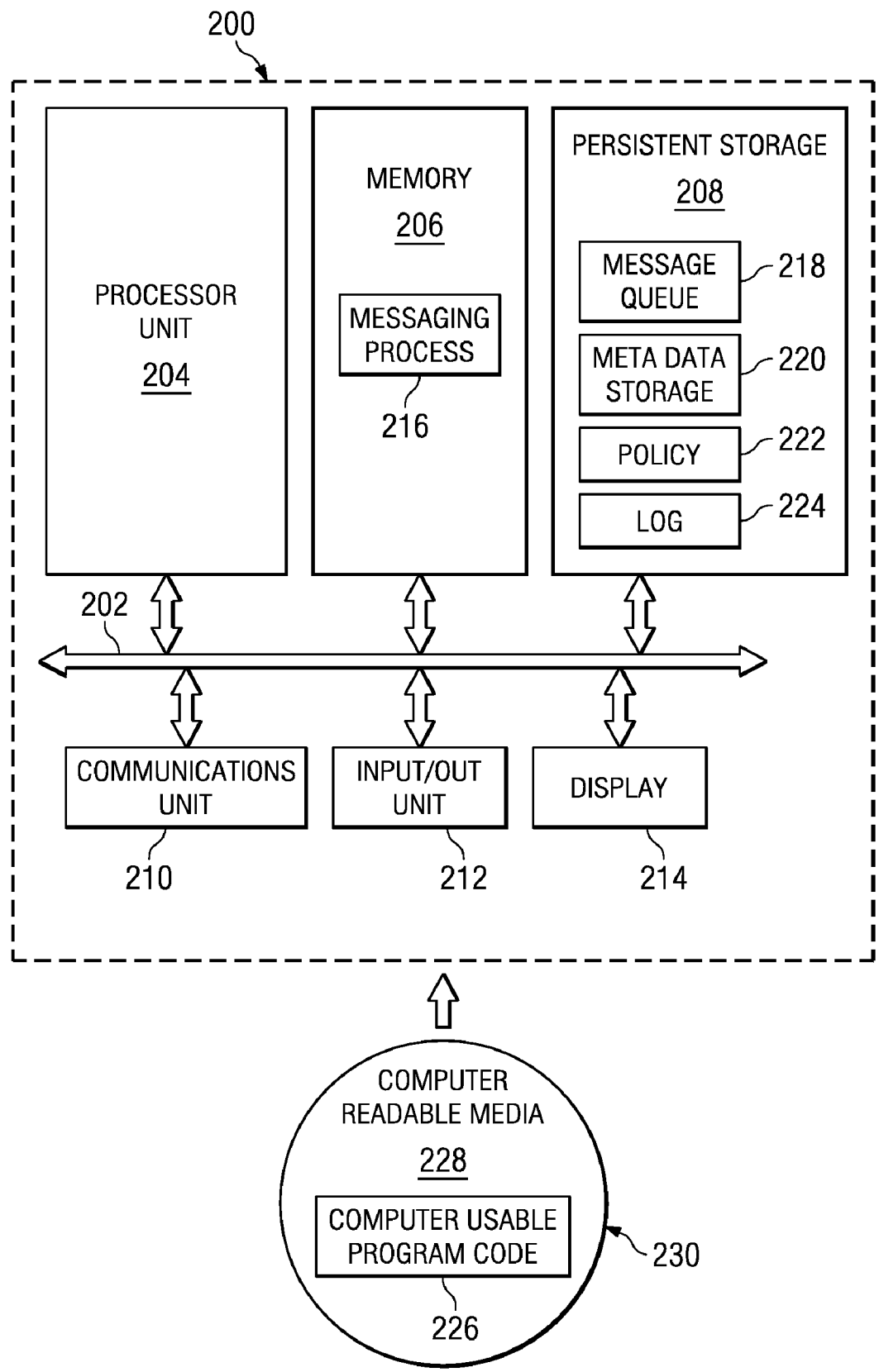
FIG. 2 is a diagram of a data processing system in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Mobile phone 116 and personal digital assistant 118 also connect to network 102 and additional examples of clients. Network data processing system 100 may include additional servers, clients, and other devices not shown.

The devices depicted in network data processing system 100 are used to provide notifications of tasks to be performed and to perform different tasks in the different illustrative embodiments. These tasks may be performed as part of a workflow or work list in which different tasks are performed to reach a result or goal. For example, account payable processes may be implemented in network data processing system 100. In the illustrative examples, different tasks may be assigned through notifications or other types of messages sent to different clients. For example, server 104 may send a message to client 114, mobile phone 116, or personal digital assistant 118 to indicate that an approval of an invoice is needed.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit may be a symmetric multiprocessor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as computer usable program code or computer readable program code that may be read and executed by a processor in processor unit 204.

The computer readable program code may be embodied on different physical or tangible computer readable media, such as memory 206 or persistent storage 208. In these examples, computer readable program code for different processes in the illustrative embodiments may be found in memory 206 and persistent storage 208. For example, messaging process 216 may be loaded from persistent storage 208 into memory 206 for execution by processor unit 204. Further, meta data storage 220, message queue 218, policy 222 and log 224 may be found in persistent storage 208 in these examples. The data in these different components may be accessed by messaging process 216 as it is executed by processor unit 204.

In these examples, the different processes for managing messages and meta data used to associate messages with a set of states in a workflow are located in messaging clients. In the illustrative examples, the messaging clients are email programs or applications. The messaging clients also may be implemented using other forms of messaging, such as instant messaging applications or even voice-over-Internet protocol applications.

Messaging process 216 contains processes to send and receive messages as well as process messages. Further, messaging process 216 may generate and store meta data.

When messaging process 202 in messaging client 600 sends a message associated with the states in a workflow process, the meta data associated with the message is saved in meta data storage 220 by messaging process 202. Further, when messaging process 202 receives a message that is associated with meta data, the meta data associated with the message is saved in meta data storage 220. The meta data associated with a particular message is identified using unique identifiers in these examples.

Message queue 218 is used to store messages that are received by messaging process 202. Messaging queue 218 is, for example, an inbox in an email application. Messages in messaging queue 218 may be messages associated with state information. The state information for those messages are stored in meta data storage 220 in these examples.

Policy 222 is used to process events that are received by messaging process 202. Policy 222 is a set of one or more rules. The different rules in policy 222 may be applied or compared with events to determine what action is to be taken with respect to various notifications that have been sent to recipients. In particular, policy 222 is used to determine when messages sent to recipients are no longer needed and can be removed from the messaging clients of those recipients.

For example, when an event is received, the meta data associated with that event is identified in meta data storage 220. One or more rules from policy 222 are compared to the identified meta data in meta data storage 220 and the event.

The result of this comparison may be used to identify an action to be taken. This action may take various forms. For example, the message associated with the state may be revoked or removed from recipients who have not responded or taken action on the messages sent to them.

Another action may be to take no action. For example, the message may require two recipients to perform a task. For example, if an event indicates that only one recipient has performed the task and the meta data does not include an indication that any other recipient has performed the task, then the message sent to the recipients is not ready to be revoked or removed. A counter identifying how many recipients have performed a task may be included in the meta data in meta data storage 220.

Depending on the particular implementation, policy 222 may specify that the action to be performed may include sending an additional message with associated meta data. Further, in some embodiments, policy 222 is a particular rule that is embedded in the meta data or message. In other embodiments, an identifier within the meta data may be used to identify the particular rule or rules within policy 222 to apply to an event.

Log 224 include entries that identify what message has been removed from message queue 218 in response to receiving a request to revoke a message in message queue 218. Further, entries may be present to identify prior messages, associated with states in a workflow, that have been sent out in which the request tasks have been completed. Log 224 may include information about when the messages were received, sent, and/or revoked.

In these examples, the different processes for managing messages and meta data used to associate messages with a set of states in a workflow are located in messaging clients. In the illustrative examples, the messaging clients are email programs or applications. The messaging clients also may take the form of instant messaging applications or even voice-over-Internet protocol applications.

Computer usable program code 226 is located in a functional form on computer-readable tangible storage device 228 and may be loaded onto or transferred to data processing system 200. Computer usable program code 226 and computer-readable tangible storage device 228 form a computer program product 220 in these examples. In one example, computer-readable tangible storage device 218 may be, for example, an optical or magnetic disc that is inserted or placed into a drive or other device that is part of persistent storage 208 for transfer onto a storage device, such as a hard drive, that is part of persistent storage 208. Computer-readable tangible storage device 228 also may take the form of persistent storage 208, such as a hard drive or a flash memory, that is connected to data processing system 200.

Alternatively, computer usable program code 216 may be transferred to data processing system 200 from computer-readable tangible storage device 218 through a communications link to communications unit 210 and/or through a connection to input/output unit 212.

The different components illustrated for data processing system 200 are not meant to limit the architecture in which different embodiments may be implemented. The different illustrative embodiments may be implemented in a data processing system including components in addition to or in place of those illustrated for data processing system 200.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus, and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

The different illustrative embodiments recognize that it would be desirable to avoid having users take action or respond to notification messages when the requested action has already been performed. The different illustrative embodiments provide a solution for rolling back or retrieving notifications that have been sent out when those notifications are no longer current or needed.

The different illustrative embodiments provide a computer implemented method, apparatus, and computer usable program code for managing notifications sent in messages. A message is sent to a set of recipients. The set of recipients is a set of one or more recipients in these examples. Meta data associated with the message is sent to the set of recipients. In response to receiving an event associated with the message, the event is processed with a policy to identify an action. The action identified by processing the event with the policy is then performed.

In the illustrative examples, the meta data associated with the message takes the form of a message tag. This message tag contains state information for the message. In response to receiving an event, an action may be identified by processing the event. The event may take different forms depending on the implementation. In one example, the event takes the form of a reply message tag. In another example, the event may be a read receipt for an email message. In this example, a read receipt contains a message identifier identifying the meta data associated with the sent message may be processed to determine what action is to be taken.

Figure 3:
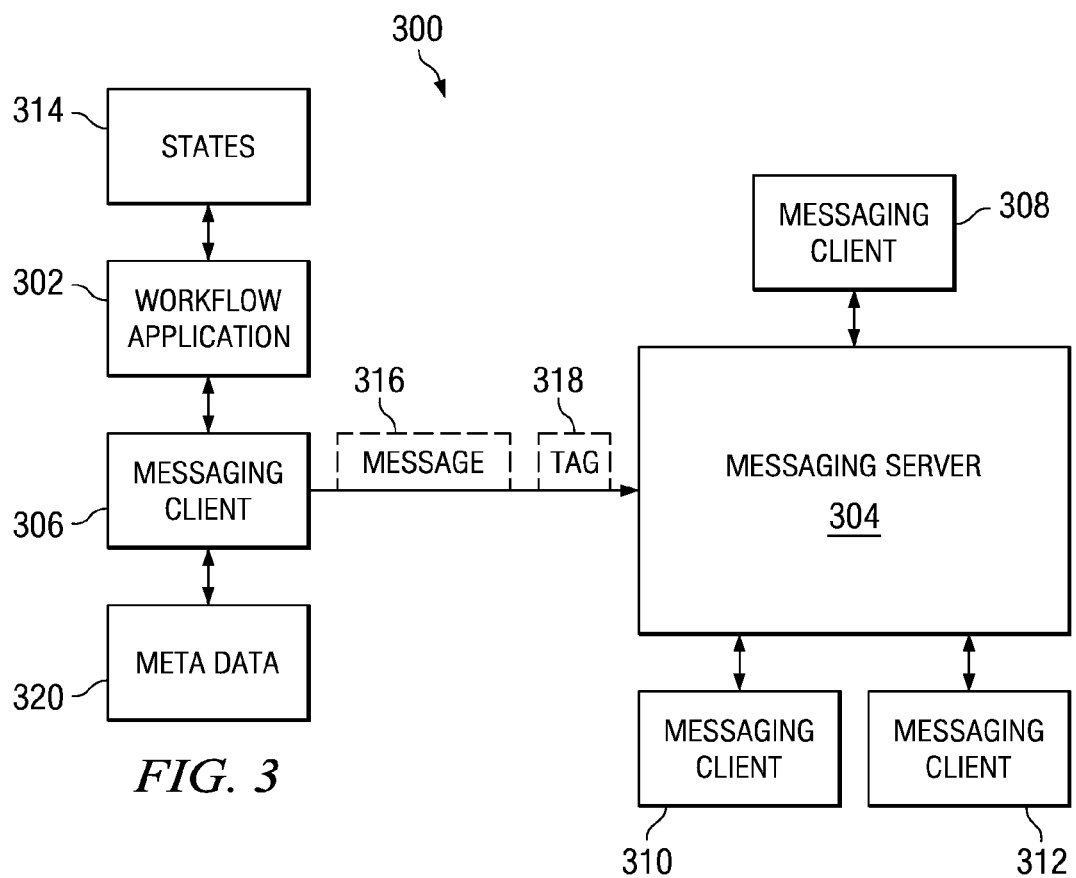
FIG. 3 is a diagram illustrating data flow for managing notifications in accordance with an illustrative embodiment.

With reference now to FIG. 3, a diagram illustrating data flow for managing notifications is depicted in accordance with an illustrative embodiment. In this example, workflow system 300 includes workflow application 302, messaging server 304, messaging client 306, messaging client 308, messaging client 310, and messaging client 312.

The different components illustrated may execute on different data processing systems. For example, workflow application 302 may execute on a data processing system, such as server 106 in FIG. 1. Messaging server 304 may execute on a data processing system, such as server 104 in FIG. 1. The different messaging clients may be located on clients, such as client 110, client 112, and client 114, mobile phone 116, or personal digital assistant 118 in FIG. 1. In particular, the different messaging clients may execute on a data processing system, such as data processing system 200 in FIG. 2. Messaging clients 306, 308, 310, and 312 each may include messaging process 216, messaging queue 218, meta data storage 220, policy 222, and log 224 in FIG. 2.

In some examples, some components may be located on the same data processing system. For example, workflow application 302 and messaging client 306 may be located on the same data processing system.

In these illustrative examples, workflow application 302 includes states 314, which are a set of states for a workflow processed by workflow application 302. For example, workflow application 302 may be an accounts payable application in which states 314 represent different states that occur during the processing of an invoice for payment.

At some point in processing the workflow, a particular state in states 314 may require action by one or more persons. In response, workflow application 302 may send a notification to different users to request that one or more of those persons perform a particular task such that the workflow can continue.

In this example, workflow application 302 sends the notification in the form of message 316 and tag 318, which are distributed to recipients. Messaging server 304 receives message 316 and tag 318 from messaging client 306 and distributes message 316 and tag 318 to messaging clients 308, 310, and 312.

In this particular embodiment, message 316 contains a notification of a task that needs to be performed by one or more recipients of message 316. Tag 318 contains state information and is associated with message 316. Further, tag 318 is the meta data or information that associates message 316 with states 314 for a workflow. Tag 318 may be associated with message 316 by being incorporated into message 316. Tag 318 also may be a separate data structure from message 316.

Tag 318 is associated with message 316 using a unique identifier in these examples. This unique identifier may take various forms. The unique identifier may be a message identifier found in email messages. In another embodiment, the unique identifier may be generated by messaging client 306.

Messaging client 306 also saves tag 318 as meta data 320. The unique identifier in meta data 320 associates meta data 320 with message 316. Meta data 320 is used by messaging client 306 to process events that may be returned in response to actions performed or taken by different recipients receiving message 316. Meta data 320 allows messaging client 306 to identify when a received event is associated with a particular state in a workflow for which message 316 was sent.

Figure 4:
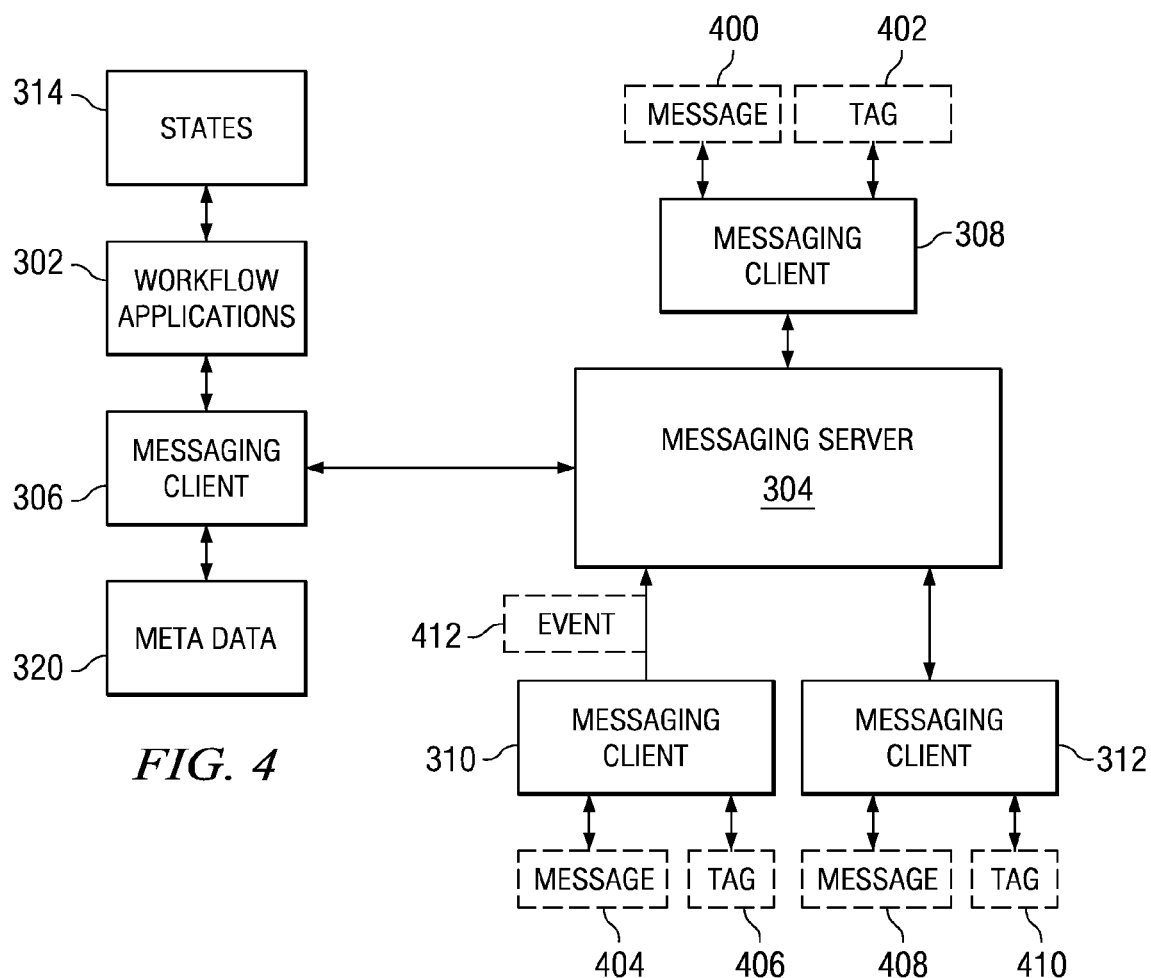
FIG. 4 is another diagram illustrating data flow in managing messages in accordance with an illustrative embodiment.

Turning now to FIG. 4, another diagram illustrating data flow in managing messages is depicted in accordance with an illustrative embodiment. In this figure, messaging client 308 has received message 400 and tag 402. Messaging client 310 has received and stored message 404 and tag 406. In a similar fashion, messaging client 312 has received and stored message 408 and tag 410. Messages 400, 404, and 408 are copies of message 316 sent by messaging client 306 in FIG. 3. Tags 402, 406, and 410 are copies of tag 318 sent by messaging client 306 in FIG. 3.

In these examples, the different messaging clients store the information and wait for a user to take an action that will generate an event. The action may, for example, view or process the message or perform the requested task. For example, if a user at messaging client 310 performs the task requested by message 404, messaging client 310 generates event 412 and sends this event back to messaging client 306.

As mentioned above, event 412 may take various forms. For example, event 412 may be a reply to message 404 and contain tag 406. The reply may be an acknowledgement that the task has been completed. Further, event 412 may be merely a read receipt indicating that the user has read message 404 at messaging client 310. In other embodiments, event 412 may just be a copy of tag 406 with changed state information to indicate that a task has been performed. In these examples, the different forms of event 412 include an identifier that associates event 412 with meta data 320. The identifier is obtained from tag 406 in these examples.

Of course, event 412 may take other forms, depending on the particular implementation. In these examples, event 412 contains information needed to determine whether a particular task requested and the message has been performed. Further, event 412 also includes information used to identify the message in which the notification was originally sent.

Figure 5:
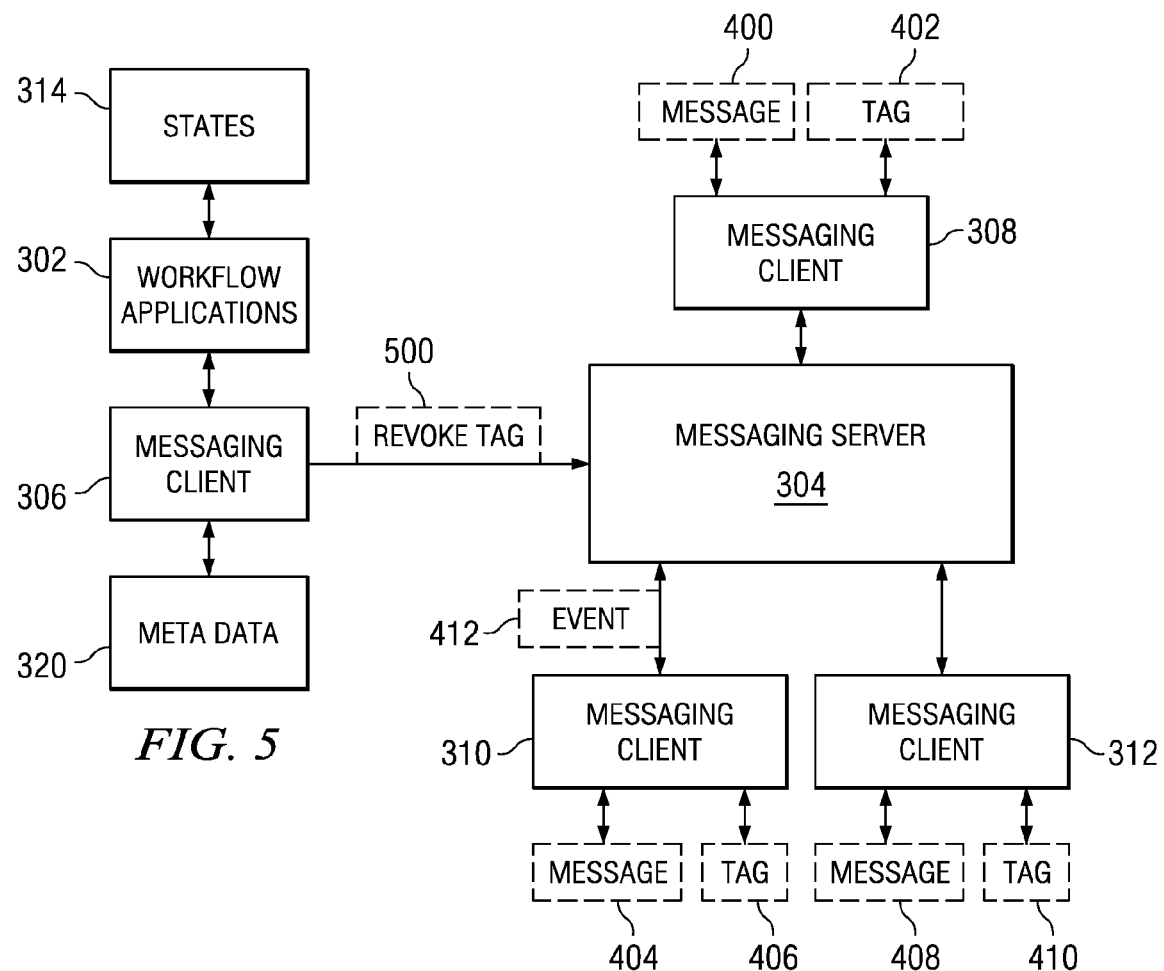
FIG. 5 is a diagram illustrating data flow followed in revoking messages in accordance with an illustrative embodiment.

Next in FIG. 5, a diagram illustrating data flow followed in revoking messages is depicted in accordance with an illustrative embodiment. In this figure, messaging client 306 has received event 412 generated in FIG. 4. Messaging client 306 identifies that meta data 320 is associated with event 412 through comparing the unique identifiers. In this example, the processing of event 412 results in a determination that message 400 and message 408 are no longer needed. For example, processing of event 412 may indicate that additional actions from the other recipients are no longer needed.

The different illustrative embodiments provide an ability to revoke or remove these messages from the other messaging clients by sending revoke tag 500. In this example, revoke tag 500 is sent to the recipients of the notification message. Revoke tag 500 is sent to recipients at messaging clients 308 and 312 in these examples.

Messaging client 306 identifies the recipients of the original notification message using meta data 320. Revoke tag 500 is sent to the recipients through messaging server 304. Revoke tag 500 results in messages 400 and 408 being removed from messaging clients 308 and 312. In addition, tags 402 and 410 also are removed. A log of the actions may be kept at messaging clients 308 and 312 to allow a recipient to view or see messages that were removed from the messaging clients.

As a result, messages sent with respect to a set of states, such as states 314, in a workflow may be tracked in a manner that allows for those messages to be revoked or removed when an event occurs satisfying a particular state for which the notification message was sent. Thus, other users are minimally impacted because those users are no longer inundated with unnecessary messages.

Further, this type of system does not require special processes at a messaging server although the processes could be implemented at a server. In these examples, the different processes are located with messaging clients for processing and removing messages. The different tags name a unique message identifier as well as an action or state. The unique message identifier is used to associate the particular state with a particular message. The state indicates the action that should be taken.

Figure 6:
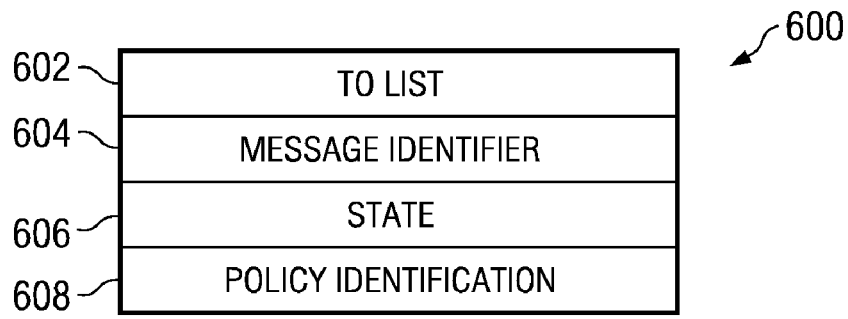
FIG. 6 is a diagram illustrating state information in accordance with an illustrative embodiment.

Turning now to FIG. 6, a diagram illustrating state information is depicted in accordance with an illustrative embodiment. State information 600 is an example of information that may be stored in meta data storage 220 in FIG. 2 and in tags, such as tag 318 in FIG. 3 or tag 402 in FIG. 4.

In this example, state information 600 includes "to list" 602, message identifier 604, state 606, and policy identification 608. "To list" 602 identifies the recipients that receive the message associated with state information 600. Message identifier 604 is a unique identifier used to associate the message that state information 600 is associated with. Message identifier 604 is also found in the message sent out to the recipients. This message identifier may be a unique message identifier already generated by the messaging client. Alternatively, message identifier 604 may be a unique identifier that is independent of any identifier normally created by a messaging process.

State 606 contains the state of the message. This state may take various forms. The state may be, for example, "active", which means that a task associated with a state in a workflow still needs to be performed. The state may be "revoke", which means that the message containing the notification of the task can be revoked from the recipient who has not performed the task.

State information 600 also includes policy identification 608, in these examples. This entry or field in state information 600 identifies the policy that is used to evaluate events associated with the message sent to recipients. Policy identification 608 is present in state information 600 if different rules may be applied or selected for processing events. When used, policy identification 608 is found in meta data stored in a meta data storage and not message tags in these examples. Further, the policy associated or identified for the meta data may be part of the meta data itself. In this type of implementation, policy identification 608 actually includes the policy, rather than a pointer or identifier used to look up the policy.

Figure 7:
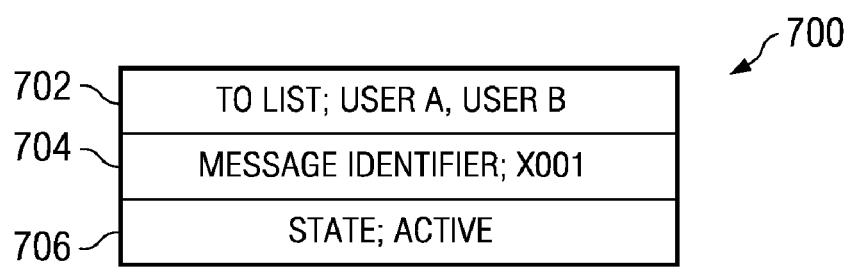
FIG. 7 is an example of meta data in accordance with an illustrative embodiment.

Turning now to FIG. 7, an example of meta data is depicted in accordance with an illustrative embodiment. Meta data 700 is an example of meta data that may be found in a message tag, such as tag 318 in FIG. 3. Additionally, meta data 700 is information that may be stored in meta data storage, such as meta data storage 220 in FIG. 2.

In this particular example, meta data 700 indicates that a message has been sent to user A and user B in "to list" 702. Message identifier 704 is the unique identifier having a value of X001 in this example. State 706 indicates that the message is "active". In other words, no event has been received to indicate that an action has been taken to change the state of the workflow process. In this example, recipient's user A and user B may have received the message but have not performed any action as requested or indicated in the notification sent in the message.

Figure 8:
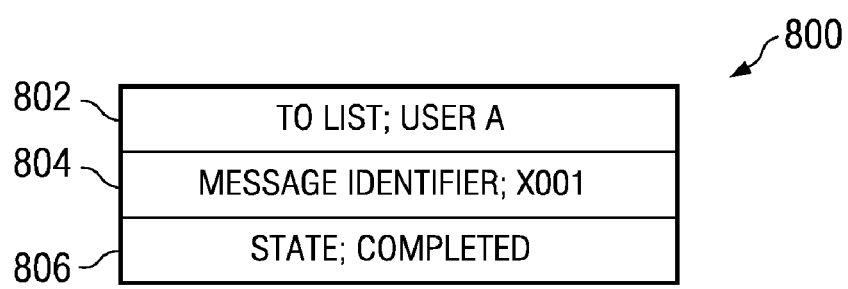
FIG. 8 is a diagram illustrating an example of an event in accordance with an illustrative embodiment.

Turning now to FIG. 8, a diagram illustrating an example of an event is depicted in accordance with an illustrative embodiment. Event 800 may be returned by a messaging client. In this example, event 800 is returned in a message tag after a user has completed a task, making it unnecessary for other recipients of the message to perform the task.

As depicted, event 800 includes an identification of the user completing the task in "to list" 802. Message identifier 804 identifies the message associated with event 800. State 806 states that the task has been completed. This event may be applied to a policy to identify an action to be taken. Of course, event 800 is only one example of an event. Event 800 may just be a read receipt. The message identifier in this type of embodiment is the message identifier generated by the email client for the email message.

Figure 9:
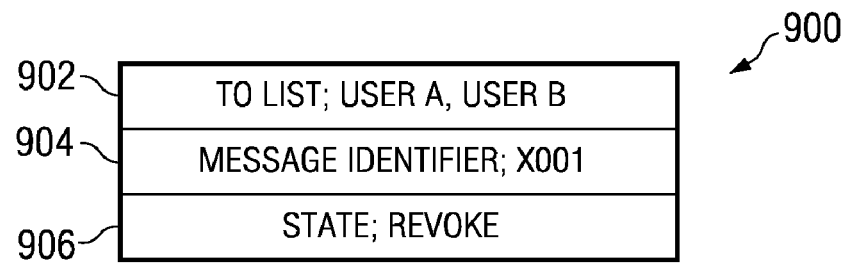
FIG. 9 is a diagram illustrating meta data used to revoke messages in accordance with an illustrative embodiment.

Turning now to FIG. 9, a diagram illustrating meta data used to revoke messages is depicted in accordance with an illustrative embodiment. Meta data 900 is an example of meta data that may be sent to recipients in a revoke tag "revoke" or remove a message from a message queue. In this example, meta data 900 indicates that the message has been sent to user A and user B in "to list" 1002. Message identifier 904 has a value of X001 in this example. Message identifier 904 is used by the messaging client that receives meta data 900 in a revoke tag to identify the message to be removed.

State 906 is "revoke". This state indicates that an action has been taken such that the message is sent to the different recipients. User A and user B are no longer necessary. Meta data 900 is sent to recipients who have not performed the task. Of course, meta data 900 may be sent to all of the recipients, depending on the implementation.

Figure 10:
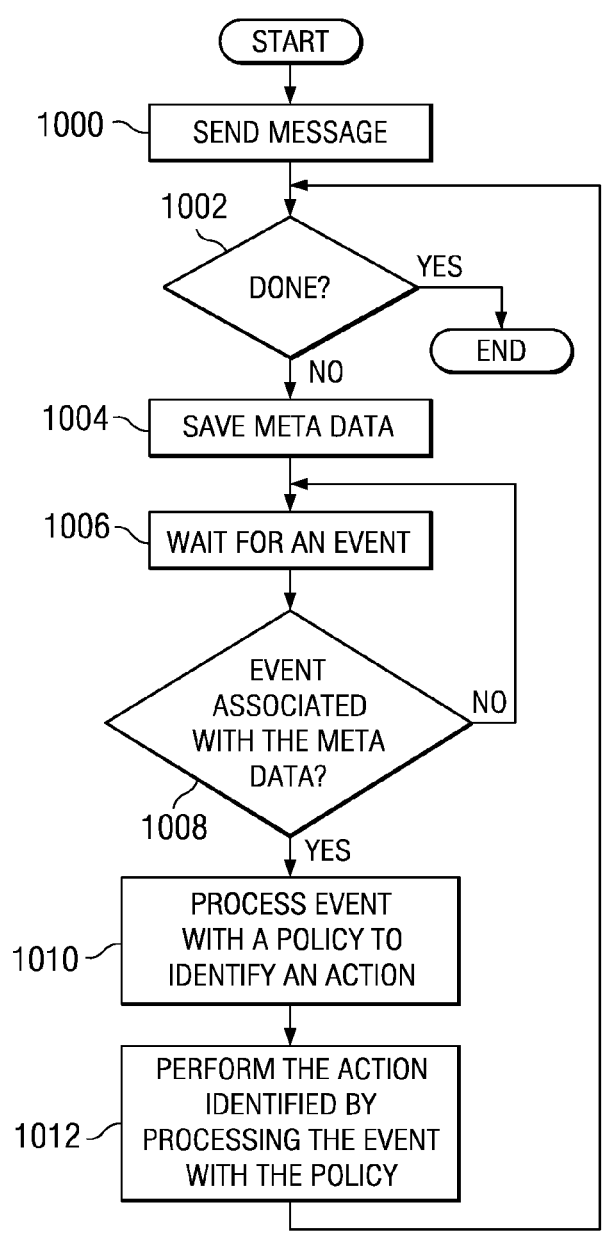
FIG. 10 is a flowchart illustrating a process for managing messages in accordance with an illustrative embodiment.

Turning now to FIG. 10, a flowchart illustrating a process for managing messages is depicted in accordance with an illustrative embodiment. The process illustrated in FIG. 10 is used to manage messages that are associated with a workflow. The process may be implemented in a software component, such as messaging process 216 in FIG. 2.

The process begins with messaging process sending a message to a set of recipients (step 1000). Typically, the message sent in step 1000 is a notification that some task needs to be performed for the particular state or stage in the workflow. The set of recipients is a set of one or more recipients in these examples.

After sending the message, messaging process 216 determines whether the process is done or complete (step 1002). In this portion of the process, the determination involves identifying whether the message is associated with a particular state or task in a workflow in these examples. In some cases, the message may be sent by itself as a notification without any state information or meta data being associated with the message.

If the message is associated with meta data, messaging process 216 then saves the meta data (step 1004). This information may be saved in a file or other data structure, such as meta data storage 220 in FIG. 2.

Next, messaging process 216 waits for an event to be received (step 1006). When an event is received, messaging process 216 determines whether the event is associated with the meta data (step 1008). If the event is not associated with the meta data, messaging process 216 returns to step 1006.

Otherwise, messaging process 216 processes the event is processed with the policy to identify an action (step 1010). This processing of the event includes identifying the meta data associated with the event. The meta data may be used to identify the policy. For example, if the message sent to the set of recipients was for the recipient to perform a particular task, the policy may determine whether the task has been performed based on the received event. If the task has been performed, the identified action may be to revoke or remove the message sent to other recipients.

Alternatively, if the message requires more than one recipient to perform an action, the policy may determine whether the needed number of recipients have performed the action. This determination may be made by comparing the event and the meta data stored for the particular message with the policy.

For example, if three recipients are required to perform an action, a counter may be maintained in the state information that identifies the number of recipients that have performed the requested action. When an event indicating that the requested action has been performed is received, the policy may determine whether the recipient performing the event in the number of recipients identified in the counter having performed the event has now reached three recipients. If three recipients are identified as having performed the requested task, then the action identified is to retrieve or revoke the message from other recipients.

If the number of recipients needed to perform the task as not been reached, then the action identified using the policy is to increment the counter in this example. Thereafter, messaging process 216 performs the action identified by processing the event with the policy (step 1012) with the process returning to step 1002.

Messaging process 216 returns to step 1002 to determine whether additional events may occur with respect to the particular message. For example, if the action identified in step 1012 is to increment a counter, then the message is still in an active state with respect to the task or state associated with the message through the saved meta data. On the other hand, if the action performed in step 1012, is to revoke the message from the recipients, then no further processing of events will occur and the process performed by messaging process 216 is done or complete.

Figure 11:
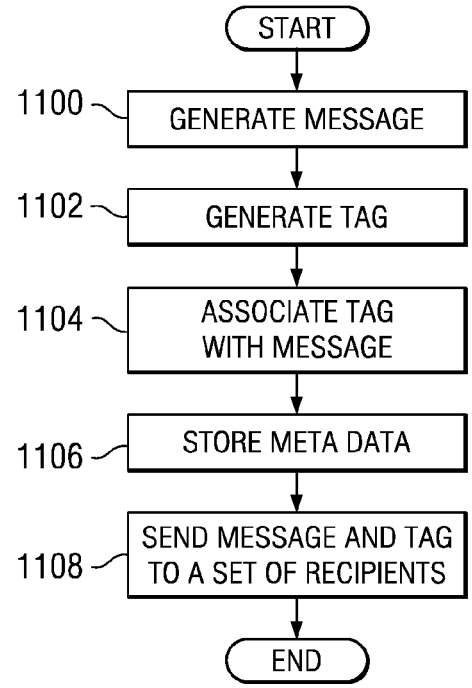
FIG. 11 is a flowchart of a process for sending a message in association with a set of states in a workflow in accordance with an illustrative embodiment.

Turning now to FIG. 11, a flowchart of a process for sending a message in association with a set of states in a workflow is depicted in accordance with an illustrative embodiment. The process illustrated in FIG. 11 may be implemented in a messaging process, such as messaging process 216 in FIG. 2.

Messaging process 216 begins by generating a message (step 1100). Thereafter, messaging process 216 generates a tag (step 1102). In this example, the tag contains meta data about the message. In particular, the meta data relates to the state of a process in a workflow. Next, messaging process 216 associates the tag with the message (step 1104). The tag is associated with the message in these examples, by placing the tag into the message. The meta data in the message tag is stored (step 1106). The meta data may be stored locally by the process for use in handling events that are received.

Messaging process 216 sends the message and the tag to a set of recipients (step 1108) with the process terminating thereafter. In these examples, the message and the tag may be sent in the same message or as separate messages, depending on the particular implementation.

Figure 12:
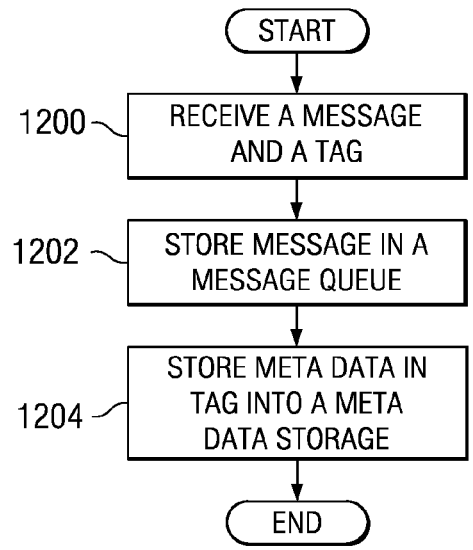
FIG. 12 is a flowchart of a process for handling received messages in accordance with an illustrative embodiment.

Turning now to FIG. 12, a flowchart of a process for handling received messages is depicted in accordance with an illustrative embodiment. The process illustrated in FIG. 12 may be implemented in a software component, such as messaging process 216 in FIG. 2.

Messaging process 216 begins by receiving a message and a tag (step 1200). The message and tag may be received as a single message in step 1200 in these examples. Alternatively, they may be received as separate data structures.

Messaging process 216 then stores the message in a message queue (step 1202). The message queue may be, for example, message queue 218 in FIG. 2. The meta data in the tag is stored in a meta data storage (step 1204) with messaging process 216 terminating thereafter. In these examples, the meta data storage is meta data storage 220 in FIG. 2.

Turning now to FIG. 13, a flowchart of a process handling receipt of an event in the form of a tag is depicted in accordance with an illustrative embodiment. The process illustrated in FIG. 13 may be implemented using a software component, such as messaging process 216 in FIG. 2.

Messaging process 216 begins by receiving a tag (step 1300). Thereafter, messaging process 216 parses the tag for a message identifier and state information (step 1302). Messaging process 216 identifies a policy using the message identifier (step 1304). The policy may be identified using the message identifier in these examples. The message identifier is used to locate the meta data, which contains an identification of the policy to use.

Next, messaging process 216 compares the state information in the message tag to the policy (step 1306). The comparison in step 1306 may include the stored meta data identified with the message identifier. The meta data may include other information used by the policy. For example, the meta data may include a counter identifying a number of recipients who have performed the task.

Based on the comparison, messaging process 216 performs an action using the policy (step 1308). Thereafter, the identified action is performed (step 1310) with the process terminating thereafter.

Turning now to FIG. 14, a flowchart of a process for handling a state change is depicted in accordance with an illustrative embodiment. The process illustrated in FIG. 14 may be implemented in a software component, such as messaging process 216 in FIG. 2.

Messaging process 216 begins by changing a state in the meta data for the message (step 1400). This change in state may be from an active state to a revoke state. The change in state also may be to increment a counter in the meta data. The state is changed in the meta data stored for the message. Next, messaging process 216 determines whether messages associated with the state information should be revoked (step 1402).

In some cases, the change in state may require additional changes in state before the messages are revoked for the set of recipients that have not yet responded or performed a particular task. For example, if the particular state requires two recipients to perform a task, a change in state that indicates that one recipient has performed the task does not result in the message being revoked from the other recipients.

If the message associated with the state information is to be revoked, then messaging process 216 generates a tag with the change state (step 1404). Thereafter, messaging process 216 sends the tag to the recipients of the message associated with the message tag (step 1406). In these examples, the tag is sent to recipients that have not yet performed the task. The messaging process 216 terminates thereafter. The messaging process 216 also terminates from step 1402 if the message associated with the state information is not to be revoked.

Turning now to FIG. 15, a flowchart of a process for handling a message tag is depicted in accordance with an illustrative embodiment. The process illustrated in FIG. 15 may be implemented in a software component, such as messaging process 216 in FIG. 2. The process in FIG. 15 is used to handle message tags that revoke a previously sent message.

Messaging process 216 begins by receiving a tag with a state that indicates a received message received by the messaging client is to be revoked (step 1500). Messaging process 216 locates the message identifier in the tag (step 1502). Thereafter, messaging process 216 removes the message from the message queue (step 1504).

Next, messaging process 216 makes an entry in a log (step 1506) with the process terminating thereafter. In step 1506, an entry may be made in the log to indicate that a message was removed from the message key. In this manner, if the user desires to see what messages may have been removed, the user may view the log.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a computer implemented method, apparatus, and compute usable program product for managing message notifications. A message and an associated message tag are sent to a set of recipients, wherein the associated message tag contains state information for the message. In responsive to receiving an event from a recipient within the set of recipients, the event is processed with a policy to identify an action. The action identified by processing the event with the policy is performed. This action may be to revoke or delete the message from other recipients. A revoke tag is sent to the recipients in these examples to cause the messages to be removed.

The different illustrative embodiments may be implemented using any type of messaging system including email, instant messaging, and voice over IP messages. The illustrative examples are especially useful with respect to existing email systems, such as Lotus Notes. Lotus Notes is available from International Business Machines Corporation. Further, a combination of different types of messaging may be used in different embodiments rather than a single type of messaging system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable tangible storage device providing program code for use by or in connection with a computer or any instruction execution system. For the purposes of this description, a computer-usable or computer-readable tangible storage device can be any tangible apparatus that can store the program for use by or in connection with the instruction execution system, apparatus, or device.

The computer-readable tangible storage device can be an electronic, magnetic, optical, electromagnetic, infrared, semiconductor system (or apparatus or device) or storage device. Examples of a computer-readable tangible storage device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer-readable tangible storage device may store a computer readable program code such that when the computer readable program code is executed on a computer, the execution of this computer readable program code causes the computer to transmit another computer readable program code over a communications link.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing messages related to a workflow, the computer implemented method comprising:
    a computer sending a message and a tag to recipients, wherein the message contains a notification of a task to be performed for a state in the workflow and the tag contains state information that associates the message with the state in the workflow;
    responsive to receiving, from one of the recipients, a notification of an event that is associated with the tag and indicates that a particular action performed is related to the task to be performed for the state in the workflow, the computer determining another action related to the task to be performed for the state in the workflow, based on the event and whether a predetermined number greater than the one of the recipients has performed respective tasks associated with the state in the workflow; and
    the computer performing the another action.

2. The computer implemented method of claim 1, wherein the another action comprises the computer sending a new tag to the recipients in which the new tag revokes the message sent to the recipients in response to a determination that the predetermined number greater than the one of the recipients has performed the respective tasks associated with the state in the workflow.

3. The computer implemented method of claim 1, wherein the another action comprises the computer changing the state information for the message indicating a number of the recipients that has performed the respective tasks associated with the state in the workflow.

4. The computer implemented method of claim 1, wherein the another action comprises the computer sending a new message to the recipients; and the computer sending a new tag associated with the new message to the recipients.

5. The computer implemented method of claim 1 further comprising:
    the computer inserting an identifier for the message in the tag to associate the message with the tag.

6. The computer implemented method of claim 1, wherein the message is selected from at least one of an email message, an instant message, a text message, and a voice message.

7. The computer implemented method of claim 1 further comprising:
    the computer receiving a new tag, wherein the new tag includes a message identifier;
    the computer determining whether the message identifier in the new tag matches a particular message identifier within a set of stored message tags; and
    the computer identifying the new tag as a reply message tag if the message identifier matches the particular message identifier.

8. A computer program product comprising:
    a computer-readable tangible storage device;
    computer usable program code stored on the computer-readable tangible storage device for sending a message and a tag to recipients, wherein the message contains a notification of a task to be performed for a state in a workflow and the tag contains state information that associates the message with the state in the workflow;

computer usable program code stored on the computer-readable tangible storage device, responsive to receiving, from one of the recipients, a notification of an event that is associated with the tag and indicates that a particular action performed is related to the task to be performed for the state in the workflow, determining another action related to the task to be performed for the state in the workflow based on the event and whether a predetermined number greater than the one of the recipients has performed respective tasks associated with the state in the workflow; and computer usable program code stored on the computer-readable tangible storage device for performing the another action.

9. The computer program product of claim 8, wherein the another action comprises sending a new tag to the recipients in which the new tag revokes the message sent to the recipients in response to a determination that the predetermined number greater than the one of the recipients has performed the respective tasks associated with the state in the workflow.

10. The computer program product of claim 8, wherein the another action comprises changing the state information for the message to indicate a number of the recipients that has performed the respective tasks associated with the state in the workflow.

11. The computer program product of claim 8, wherein the action comprises sending a new message to the recipients; and the computer sending a new tag associated with the new message to the recipients.

12. The computer program product of claim 8 further comprising:

computer usable program code stored on the computer-readable tangible storage device for placing an identifier for the message in the tag to associate the message with the tag.

13. The computer program product of claim 8, wherein the message is selected from at least one of an email message, an instant message, a text message, and a voice message.

14. The computer program product of claim 8 further comprising:

computer usable program code stored on the computer-readable tangible storage device for receiving a new tag, wherein the new tag includes a message identifier;

computer usable program code stored on the computer-readable tangible storage device for determining whether the message identifier in the new tag matches a particular message identifier within a set of stored message tags; and computer usable program code stored on the computer-readable tangible storage device for identifying the new tag as a reply message tag if the message identifier matches the particular message identifier.

15. A data processing system comprising:
a processor unit;
a computer-readable tangible storage device;
a computer-readable memory; and
first program instructions for sending a message and a tag to recipients, wherein the message contains a notification of a task to be performed for a state in a workflow and the tag contains state information that associates the message with the state in the workflow; second program instructions for, responsive to receiving, from one of the recipients, a notification of an event that is associated with the tag and indicates that a particular action performed is related to the task to be performed for the state in the workflow, determining another action related to the task to be performed for the state in the workflow based on the event and whether a predetermined number greater than the one of the recipients has performed respective tasks associated with the state in the workflow; and third program instructions for performing the another action identified, wherein the first program instructions, the second program instructions, and the third program instructions are stored on the computer-readable tangible storage device for execution by the processor unit via the computer-readable memory.

16. The data processing system of claim 15, wherein the another action comprises sending a new tag to the recipients in which the new tag revokes the message sent to the recipients in response to a determination that the predetermined number greater than the one of the recipients has performed the respective tasks associated with the state in the workflow.

17. The data processing system of claim 15, wherein the another action comprises changing the state information for the message to indicate a number of the recipients that has performed the respective tasks associated with the state in the workflow.

18. The data processing system of claim 15, wherein the another action comprises sending a new message to the recipients; and sending a new tag associated with the new message to the recipients.

19. The data processing system of claim 15 further comprising:

fourth program instructions, stored on the computer-readable tangible storage device, for inserting an identifier for the message in the tag to associate the message with the tag.

20. The data processing system of claim 15, wherein the message is selected from at least one of an email message, an instant message, a text message, and a voice message.

21. The computer implemented method of claim 1, wherein the event is the particular action performed by the recipient.

22. The computer implemented method of claim 1, wherein the predetermined number greater than one of the recipients is selected from one of a numeric value and a list of recipients from the recipients that is required to perform the particular action associated with the workflow.

23. The computer implemented method of claim 1, wherein the step of the computer determining the another action to perform based on the event and whether the predetermined number greater than the one of the recipients has performed the respective tasks associated with the state in the workflow is further based on a policy embedded in the message and retrieved from the message by the computer.

24. The computer implemented method of claim 23, wherein the policy is embedded in the tag and retrieved from the tag by the computer.

* * * * *